(12) United States Patent
Li et al.

(10) Patent No.: US 8,089,192 B2
(45) Date of Patent: Jan. 3, 2012

(54) THREE-PHASE SQUARE-WAVE PERMANENT MAGNET BRUSHLESS DC MOTOR

(75) Inventors: Tiecai Li, Guangdong (CN); Yamei Qi, Guangdong (CN); Zhaoyong Zhou, Guangdong (CN); Xiang Kong, Guangdong (CN); Weilong Lan, Guangdong (CN); Feipeng Xu, Guangdong (CN)

(73) Assignee: Shenzhen Academy of Aerospace Technology, High-Tech Industrial Park, Shenzhen, Guangdong (CN)

( * ) Notice: Subject to any disclaimer, the term of this patent is extended or adjusted under 35 U.S.C. 154(b) by 504 days.

(21) Appl. No.: 12/259,537

(22) Filed: Oct. 28, 2008

(65) Prior Publication Data

US 2009/0108699 A1    Apr. 30, 2009

(51) Int. Cl.
   *H02K 1/06*    (2006.01)
(52) U.S. Cl. ....... 310/216.009; 310/216.072; 310/254.1; 310/216.069; 310/216.071; 310/216.073; 310/216.111; 310/179
(58) Field of Classification Search ........... 310/216.009, 310/216.072, 254.1, 216.069, 216.071, 216.073, 310/216.111, 179
See application file for complete search history.

(56) References Cited

U.S. PATENT DOCUMENTS

| | | | | | |
|---|---|---|---|---|---|
| 2,012,368 | A | * | 8/1935 | Zetsche | 310/265 |
| 2,227,471 | A | * | 1/1941 | Weathers | 318/692 |
| 2,506,637 | A | * | 5/1950 | Fog | 336/210 |
| 2,907,904 | A | * | 10/1959 | Carpenter | 310/166 |
| 3,054,010 | A | * | 9/1962 | Breitling | 310/216.072 |
| 3,909,647 | A | * | 9/1975 | Peterson | 310/156.12 |
| 4,140,935 | A | * | 2/1979 | Braun et al. | 310/224 |
| 4,241,274 | A | * | 12/1980 | Brammerlo | 310/216.071 |
| 4,341,971 | A | * | 7/1982 | Tohara et al. | 310/195 |
| 4,399,382 | A | * | 8/1983 | Volkrodt | 310/216.055 |
| 4,575,652 | A | * | 3/1986 | Gogue | 310/49.55 |
| 5,793,139 | A | * | 8/1998 | Nashiki | 310/216.072 |
| 6,127,753 | A | * | 10/2000 | Yamazaki et al. | 310/71 |

(Continued)

FOREIGN PATENT DOCUMENTS

CN    2389440 Y  *  7/2000

(Continued)

*Primary Examiner* — Quyen Leung
*Assistant Examiner* — Alex W Mok
(74) *Attorney, Agent, or Firm* — Global IP Services; Tianhua Gu

(57) ABSTRACT

This invention relates to a three-phase square-wave permanent magnet brushless DC motor for solving problems of the existing square-wave permanent Magnet Motor and sine-wave permanent magnet motor. In this invention, the number 2P of magnetic poles on the said rotor core is 8; the slot number Z of the said stator core is 12, accordingly there are 12 teeth, including three big teeth, three medium teeth and six small teeth; the ratio of their mechanical angles is 50° (±5°) for big teeth: 40° (±5°) for medium teeth: 15° (±5°) for small teeth, and the sum of the mechanical angles of one big tooth, one medium tooth and two small teeth must be 120°. Three-phase concentrated windings are respectively wound on the big teeth and the medium teeth, in which there are only two concentrated windings for each phase, thus there are only 6 concentrated windings for the three-phase motor. With driven by three-phase square-wave current, the said motor can produce a smooth torque which ripple index corresponds to that of the sine-wave permanent magnet servo motor, at the same time, it also has a plurality of advantages including windings end minimization, air-gap minimization, material minimization, cogging torque minimization and loss minimization and so on.

9 Claims, 4 Drawing Sheets

U.S. PATENT DOCUMENTS

| | | | |
|---|---|---|---|
| 6,226,856 B1 * | 5/2001 | Kazama et al. | 29/596 |
| 6,781,278 B2 * | 8/2004 | Liao | 310/254.1 |
| 6,856,055 B2 * | 2/2005 | Michaels et al. | 310/71 |
| 6,879,079 B2 * | 4/2005 | Vollmer | 310/254.1 |
| 7,215,052 B2 * | 5/2007 | Blase et al. | 310/87 |
| 2002/0175587 A1 * | 11/2002 | Vollmer | 310/179 |
| 2003/0048032 A1 * | 3/2003 | Brown et al. | 310/254 |
| 2003/0127933 A1 * | 7/2003 | Enomoto et al. | 310/194 |
| 2004/0007933 A1 * | 1/2004 | Hsu | 310/254 |
| 2004/0124734 A1 * | 7/2004 | Liao | 310/218 |
| 2005/0212374 A1 * | 9/2005 | Mitcham | 310/216 |
| 2005/0212377 A1 * | 9/2005 | Wang et al. | 310/259 |

FOREIGN PATENT DOCUMENTS

| | | | |
|---|---|---|---|
| CN | 2726200 Y | * | 9/2005 |
| CN | 1862928 A | * | 11/2006 |
| JP | 11234990 A | * | 8/1999 |
| JP | 2004215483 A | * | 7/2004 |

* cited by examiner

THREE-PHASE SQUARE-WAVE PERMANENT MAGNET BRUSHLESS DC MOTOR

CROSS REFERENCE TO RELATED PATENT APPLICATION

This application claims the priority of the Chinese patent application No. 200720172743.2 filed on Oct. 29, 2007, which application is incorporated herein by reference.

FIELD OF THE INVENTION

This invention relates to a permanent magnet motor, in particular a three-phase square-wave permanent magnet brushless DC motor, which is applicable for direct drive and position and rate servo-control system.

BACKGROUND ART

The permanent magnet motor can be classified into the sine-wave motor and the square-wave motor, according to its drive current and back-EMF waveform. The sine-wave permanent magnet motor is generally known as permanent magnet synchronous motor (PMSM), or the sine-wave AC servo motor. The square-wave permanent magnet motor is known as square-wave brushless DC motor (BLDCM).

During the 1980's, the square-wave permanent magnet motor was widely applied, whose external characteristics are almost the same as that of brush DC motor, and which is easy to control. But, it has a biggest disadvantage that there is great principle commutated torque ripple. Therefore, researchers put forward many compensation measures, whose effects in practical application were not satisfying.

As the torque ripple of the sine-wave permanent magnet motor is far smaller than that of the square-wave permanent magnet motor, during the 1990's, on the occasions of precision servo-drive application, the square-wave permanent magnet motor was gradually replaced by the sine-wave permanent magnet motor, which now has become the mainstream of today's industrial applications. However, the sine-wave permanent magnet motor will induce a great rise in complexity of the control system and a substantial increase of cost and what is more important is the great falling of the energy index of the motor.

On the other hand, the traditional square-wave brushless DC motor and its control technology are recognized as being mature. Due to the said disadvantage, its application is limited in occasions with lower demand, and the study on it has been rare at home and abroad.

CONTENTS OF THE INVENTION

This invention is dedicated to solve the problems of the existing square-wave permanent magnet motor and sine-wave permanent magnet motor, and put forward a square-wave permanent magnet motor with new principle, new structure, high performance, and low cost.

The technical scheme of this invention is to provide a three-phase square-wave permanent magnet brushless DC motor, with many pairs of permanent magnets on the rotor core and three-phase windings in the slot of the stator core, which is characterized in that the number 2P of magnetic poles on the said rotor core is 8; the slot number Z of the said stator core=12, accordingly with 12 teeth; the opening width of the said slot is 0.1~3.0 mm; the said 12 teeth includes three big ones, three medium ones and six small ones; The said three-phase windings are concentrated windings, which are respectively wound on the big teeth and the medium teeth in this order: A-phase windings on the big tooth→the small tooth→/C-phase winding on the medium tooth→the small tooth→B-phase on the big tooth→the small tooth→/A-phase winding on the medium tooth→the small tooth→C-phase on the big tooth→the small tooth→/B-phase winding on the medium tooth→the small tooth. Herein, A represents a concentrated winding of the A-phase windings, /A is a reversal concentrated winding of A-phase windings, and B, /B, C, /C can be deduced by analogy.

In the preferred scheme of this invention, each big tooth on the said stator core accounts for 50° (±5°) of mechanical angle in a circle, that is, 200° (±20°) of electrical angle; each medium tooth accounts for 40° (±5°) of mechanical angle in a circle, that is, 160° (±20°) of electrical angle; each small tooth accounts for 15° (±5°) of mechanical angle in a circle; the opening width of the slot is included in the mechanical angle that each tooth accounts for; and the sum of the mechanical angles of one big tooth, one medium tooth and two small teeth must be 120°.

In this invention, the magnetic pole N, S of each permanent magnet on the said rotor core are arranged alternately. The said permanent magnet is tegular magnetic steel with radial-magnetization or parallel-magnetization.

In this invention, the physical air-gap between the said stator and the said rotor preferably is 0.2~2 mm.

The hall position sensor can be adopted as the rotor position sensor in this invention. The magnetic sensitive direction of the said hall position sensor is consistent with the direction of the rotor normal. The hall position sensor is installed on the stator frame, with the distance of 1~3 mm air-gap from the outer circle of the rotor permanent magnet.

In this invention, the physical size of polar distance $\pi D/8$ of the permanent magnet on the said rotor core preferably is 10~56 mm, in which, D represents external diameter of the rotor.

In this invention, the said stator core can be made of multi-layer splicing silicon steel sheets by self-riveting and laminated. Each layer of splicing silicon steel sheets is spliced by the big, medium and small fan-shaped punched segments, which are distributed in the order of "the big-pole fan-shaped punched segment→the small-pole fan-shaped punched segment→the medium-pole fan-shaped punched segment→the small-pole fan-shaped punched segment→the big-pole fan-shaped punched segment→the small-pole fan-shaped punched segment→the medium-pole fan-shaped punched segment→the small-pole fan-shaped punched segment→the big-pole fan-shaped punched segment→the small-pole fan-shaped punched segment→the medium-pole fan-shaped punched segment→the small-pole fan-shaped punched segment" on a plane to form a stator punched segment, that is, a layer of splicing silicon steel sheet. The two adjacent fan-shaped punched segments are joined by grooves or bosses placed on the outside of yokes. Herein, the grooves are placed on the outside of the yokes of the big-pole and medium-pole fan-shaped punched segments and the bosses on the outside of the small-pole fan-shaped punched segment; or the bosses are placed on the outside of the yokes of the big-pole and medium-pole fan-shaped punched segments and the grooves on the outside of the yoke of small-pole fan-shaped punched segment.

In another preferred scheme of this invention, multi-layer silicon steel sheets are laminated into three shapes of fan-shaped tooth pole, which then form the said stator core; in which the big tooth pole is made of the big-pole fan-shaped punched segments by laminated, the medium tooth pole is made of the medium-pole fan-shaped punched segments by laminated, and the small tooth pole is made of the small-pole fan-shaped punched segments by laminated; in each tooth pole, at the yoke and tooth of each fan-shaped punched segment, there is a position blind hole through which many fan-shaped punched segments are riveted and laminated into a whole tooth pole; a whole stator core is formed by the said three kinds of the tooth pole arranged in the order of "the A-phase big teeth pole→the small tooth pole→the /C-phase medium tooth pole→the small tooth pole→the B-phase big tooth pole→the small tooth pole→the /A-phase medium tooth pole→the small tooth pole→the C-phase big tooth pole→the small tooth pole→the /B-phase medium tooth pole→the small tooth pole".

In another preferred scheme in this invention, the said stator core is made of multi-layer whole silicon steel sheets through self-riveting or riveted with rivets and laminated; in each layer of the whole silicon steel sheet with all three tooth shapes, the three shapes will be distributed in peripheral in the order of "the A-phase big tooth→the small tooth→the /C-phase medium tooth→the small tooth→the B-phase big tooth→the small tooth→the /A-phase medium tooth→the small tooth→the C-phase big tooth→the small tooth pole→the /B-phase medium tooth→the small tooth."

According to the technical solution mentioned above, in this invention the number 2P of magnetic poles of the three-phase square-wave permanent magnet brushless DC motor is 8; pole-cover technology is employed to create a planar with a electrical angle of more than 120° in the air-gap magnetic field; By adopting asymmetry teeth slots and small teeth with magnetic balance, it is to minimize the cogging torque. There are only two concentrated windings in each phase of the motor, thus it is simply structured and low production cost. The output of this motor surpasses the traditional sine-wave permanent magnet servo motor by 33%. What's more, the ends of the winding are over three times smaller than that of the traditional sine-wave permanent magnet servo motor, so that copper loss is greatly reduced. With three-phase square-wave current drive, the said three-phase square-wave permanent magnet brushless DC motor can produce a smooth torque which ripple index corresponds to that of the sine-wave permanent magnet servo motor.

DESCRIPTION OF FIGURES

This invention will be further illustrated with reference to the accompanying figures and embodiments, in which.

EMBODIMENTS OF THE INVENTION

Figure 1:
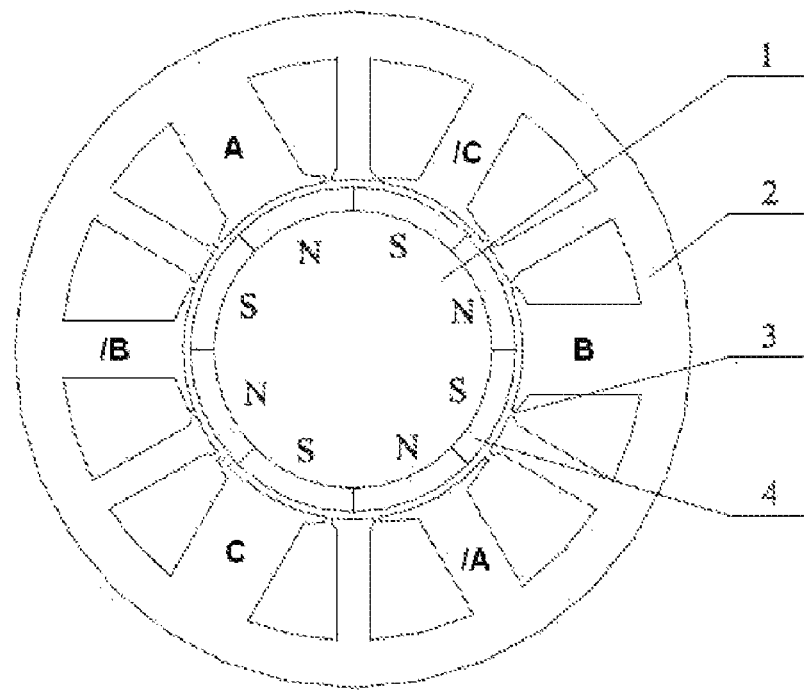
FIG. 1 is a profile structural diagram of a stator and rotor of a motor in one preferred embodiment in this invention.
Figure 2:
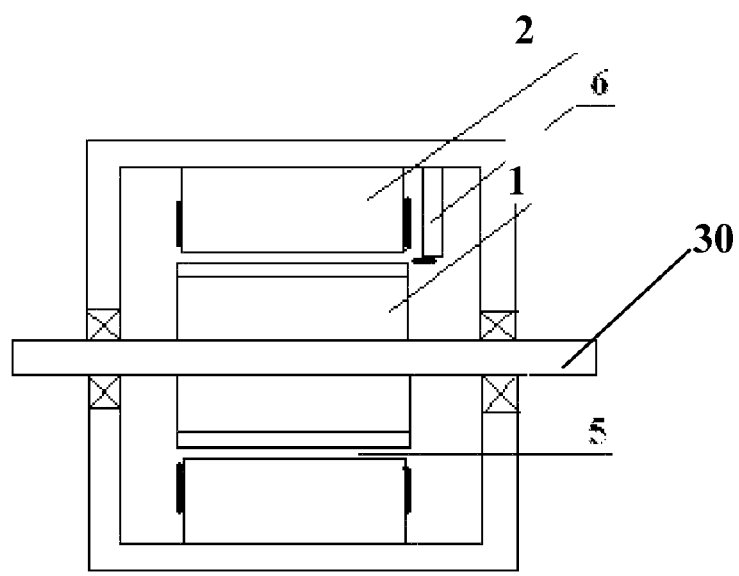
FIG. 2 is a motor assembly structural diagram in one preferred embodiment in this invention.

An preferred example in this invention is indicated in FIG. 1 and FIG. 2. In FIG. 2, the main structure of this three-phase permanent magnet brushless DC motor is indicated, whose main components comprise a rotor 1, a stator 2, a shaft 30 and so on, and physical air-gap 5 between the rotor 1 and the stator 2 is 0.2-2 mm. The magnetic sensitive direction of a hall position sensor is consistent with the direction of the rotor normal. The hall position sensor is installed on the stator frame 6 with the distance of 1~3 mm air-gap from the outer circle of the rotor permanent magnetic steel (the permanent magnet).

In FIG. 1, a permanent magnet 4 with many pairs of poles on the rotor core produces air-gap magnetic field; in FIG. 1, there are 4 pairs of the permanent magnets with 8 magnetic poles N, S arranged alternately, that is, the number 2P of magnetic poles of the rotor is 8. In practical implementation, the permanent magnet 4 can be the tegular magnetic steel with radial-magnetization or parallel-magnetization. The physical size of polar distance π D/8 of the permanent magnet on the rotor core is 10~56 mm, in which D represents rotor external diameter.

Furthermore, the number Z of the stator slots is 12, corresponding to twelve teeth; the opening width of the slot 3 in the stator is 0.1~3 mm; in the twelve teeth, three big teeth, three medium teeth and six small teeth are distributed circularly in the circle according to the order of "the big tooth→the small tooth→the medium tooth→the small tooth". When assembled, three-phase windings will be installed in the 12 slots of the stator core.

In this embodiment, the three-phase windings are concentrated windings, which are respectively wound on the insulation of the big teeth and the medium teeth by stator winding machine in this order: A-phase windings on the big teeth→the small teeth→/C-phase winding on the medium teeth→the small teeth→B-phase on the big teeth→the small teeth→/A-phase winding on the medium teeth→the small teeth→C-phase on the big teeth→the small teeth→/B-phase winding on the medium teeth→the small teeth. Wherein, A is a concentrated winding of the A-phase windings, and /A is a reversal concentrated winding of A-phase windings; B is a concentrated winding of the B-phase windings, and /B is a reversal concentrated winding of B-phase windings; C is a concentrated winding of the C-phase windings, and /C is a reversal concentrated winding of C-phase windings. After wound in this way, two concentrated windings of each phase are connected in series by winding, thereby the connection can be reduced and the process of production simplified. Obviously, there are only two concentrated windings in each phase (only six concentrated windings in the three-phase motor totally). The total number of windings in the motor is very few, accordingly its structure is greatly simplified and production cost is significantly decreased. What's more, the ends of the winding are reduced to ⅓~⅙ or even less of that of the traditional motors, up to minimization, thus copper loss is greatly reduced.

Figure 3:
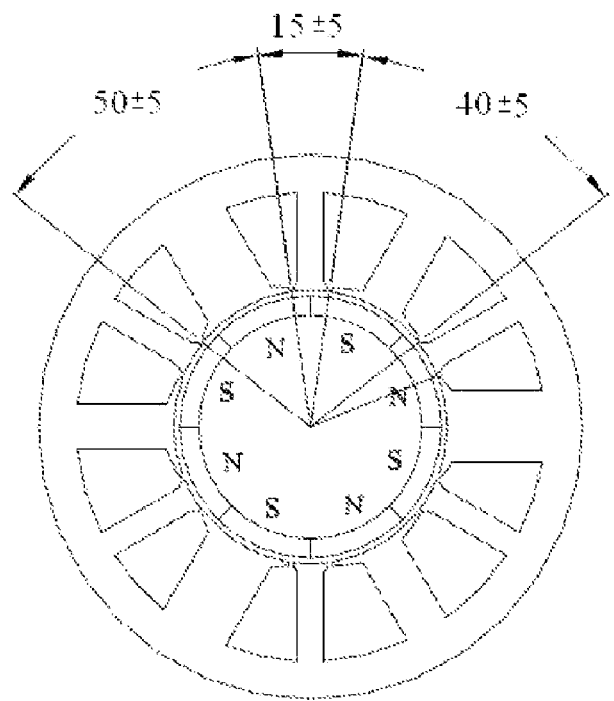
FIG. 3 is a tooth angle distribution diagram of the stator in the embodiment described in FIG. 1.

From FIG. 3, each big tooth on the stator core 2 accounts for 50° (±5°) of mechanical angle in a circle, so each big tooth accounts for 200° (±20°) of electrical angle because there are 4 pairs of poles, that is, 4×360° of electrical angle. The pole width of the said concentrated winding is more than 180° of electrical angle, so the polar pitch is totally covered, that is, the winding pitch is artificially increased, so that more air-gap magnetic flux can be collected for the purpose of square wave. Each medium tooth accounts for 40° (±5°) of mechanical angle in a circle, that is, 160° (±20°) of electrical angle and the pole width of the said concentrated winding is more than 120° of electrical angle. Each small tooth accounts for 15° (±5°) of mechanical angle in a circle but no windings; the opening width of the slot (0.1~3 mm) is included in the said mechanical angle that each tooth accounts for. The ratio of their mechanical angles is 50° (±5°) for big teeth: 40° (±5°) for medium teeth: 15° (±5°) for small teeth, and the sum of mechanical angles of one big tooth, one medium tooth and two small teeth must be 120°. In practical application, mechanical angles of the big, medium and small tooth can be 50°, 40°, 15°, or 48°, 42°, 15°, or 52°, 40°, 14°, or other combinations which can meet the demands mentioned above.

The scheme in the embodiment mentioned above can be called as pole-cover technology. Because the pole width of the two A-phase concentrated windings is more than or close to 160° of electrical angle, a planar air-gap magnetic field with more than 135° of electrical angle is induced by the concentrated winding on the big tooth, and a planar air-gap magnetic field with more than 120° of electrical angle is induced by the concentrated winding on the medium tooth. Due to the difference of 180° mechanic angle between two poles of each phase in space, and the cover ratio of two poles being (200°+160°)/2=180°, a planar wave with more than 120° of electrical angle is induced by phase-winding back-EMF which is formed by two concentrated windings connected in series. The traditional square-wave permanent magnet DC motor cannot achieve a planar air-gap magnetic field with more than 120° of electrical angle, which result in the commutated torque ripple and the cogging torque increasing.

The frequency of the cogging torque of the traditional square-wave permanent magnet brushless DC motor with uniformly-distributed 8 phases and 12 slots is 8×12/4=24. The amplitude of the cogging torque can be generally regarded as 1/24(i.e. 4.1%) of the torque fundamental wave, so the cogging torque is very great. For adopting three different tooth shapes of big, medium, and small in this invention, the frequency of the cogging torque is 216, whose amplitude can be roughly regarded as 1/216(i.e. 0.45%) of the torque fundamental wave. Through comparison, the cogging torque is decreased by nearly 10 times. With the structure of big, medium and small teeth, the cogging torque is greatly decreased, which overcomes the biggest weakness of the traditional square-wave permanent magnet DC motor, even has an advantage over the sine-wave permanent magnet DC motor.

The control system and method thereof presented in patent application which is entitled as "A CONTROL SYSTEM FOR A BRUSHLESS DC MOTOR AND A CONTROL METHOD THEREOF" and has International Application No. PCT/CN2007/000178 can be adopted for drive control of the three-phase permanent magnet brushless DC motor in this invention, herein, the inventive square-wave brushless motor is adopted for continuous current sampling and closed-loop control, which surpasses the sine-wave AC servo system in comprehensive properties, with correspondent torque fluctuation index, but its output increased by 33% and the copper loss greatly decreased. The three-phase permanent magnet brushless DC motor can replace the existing sine-wave AC servo motor and its servo units as the main branch of the future servo motor and its servo units.

Figure 4:
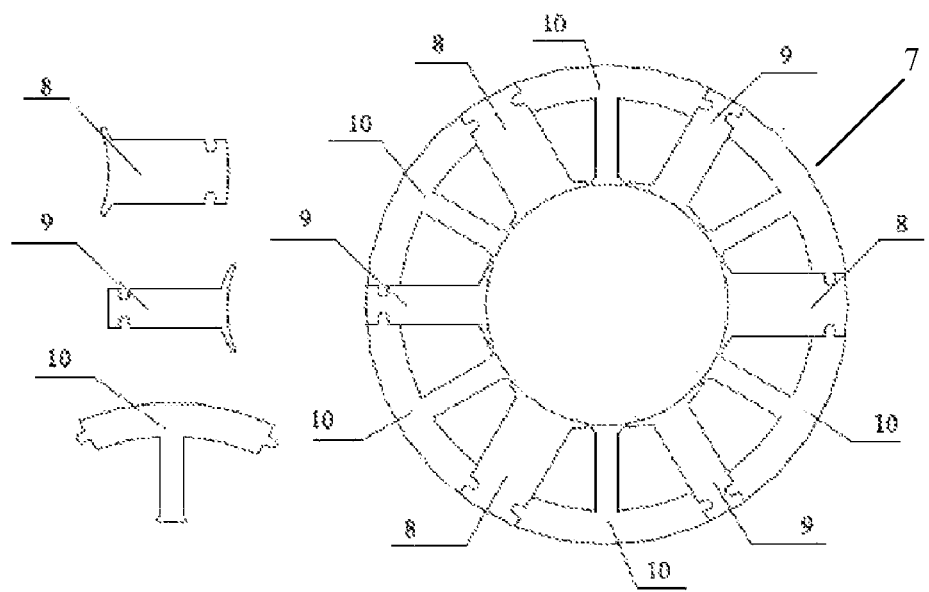
FIG. 4 is a structural diagram of the stator punched segment consisting of three kinds of fan-shaped punched segments.

In the embodiment as shown in FIG. 4, stator core 2 is made of multi-layer splicing silicon steel sheets 7 by self-riveting and laminated, in which, each layer of splicing silicon steel sheets is spliced by three kinds of punched segments, which particularly are big, medium and small fan-shaped punched segments. Two grooves are placed on the outside of the yoke of big-pole fan-shaped punched segment 8, and also two grooves on the outside of the yoke of medium-pole fan-shaped punched segment 9. Two bosses, which can be slotted into the said grooves, are placed on the outside of small-pole fan-shaped punched segment 10. In FIG. 4, according to the following order: "the big-pole fan-shaped punched segment→the small-pole fan-shaped punched segment→the medium-pole fan-shaped punched segment→the small-pole fan-shaped punched segment→the big-pole fan-shaped punched segment→the small-pole fan-shaped punched segment→the medium-pole fan-shaped punched segment→the small-pole fan-shaped punched segment→the big-pole fan-shaped punched segment→the small-pole fan-shaped punched segment→the medium-pole fan-shaped punched segment→the small-pole fan-shaped punched segment", the punched segments are distributed on a plane to form a piece of stator punched segment, that is, a layer of splicing silicon steel sheet. A whole stator core can be made of multi-layer splicing silicon steel sheets by self-riveting and laminated.

Figure 5:
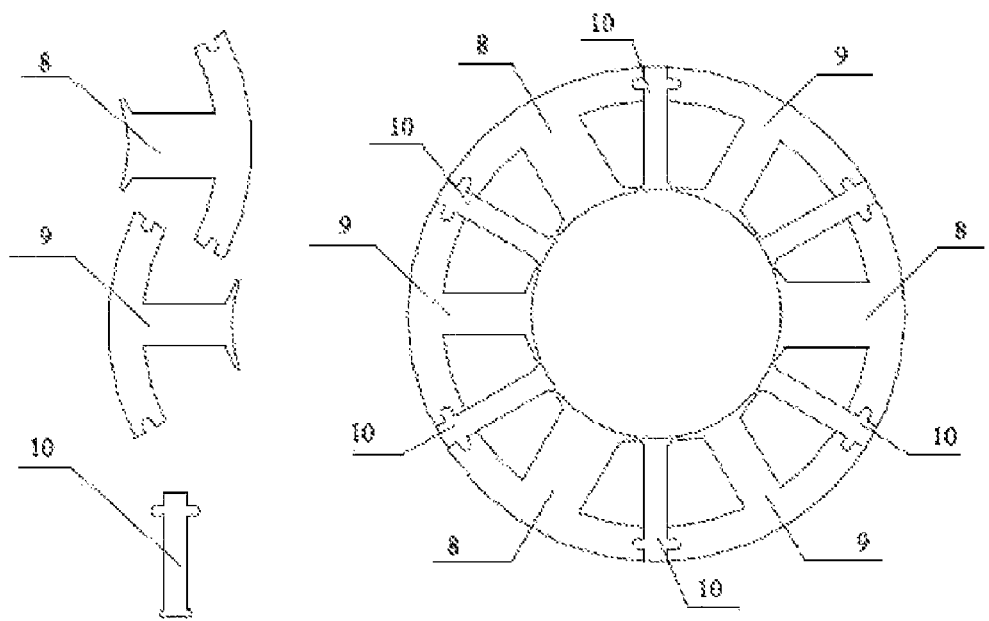
FIG. 5 is another embodiment of the stator punched segment consisting of three kinds of fan-shaped punched segments.
Figure 6:
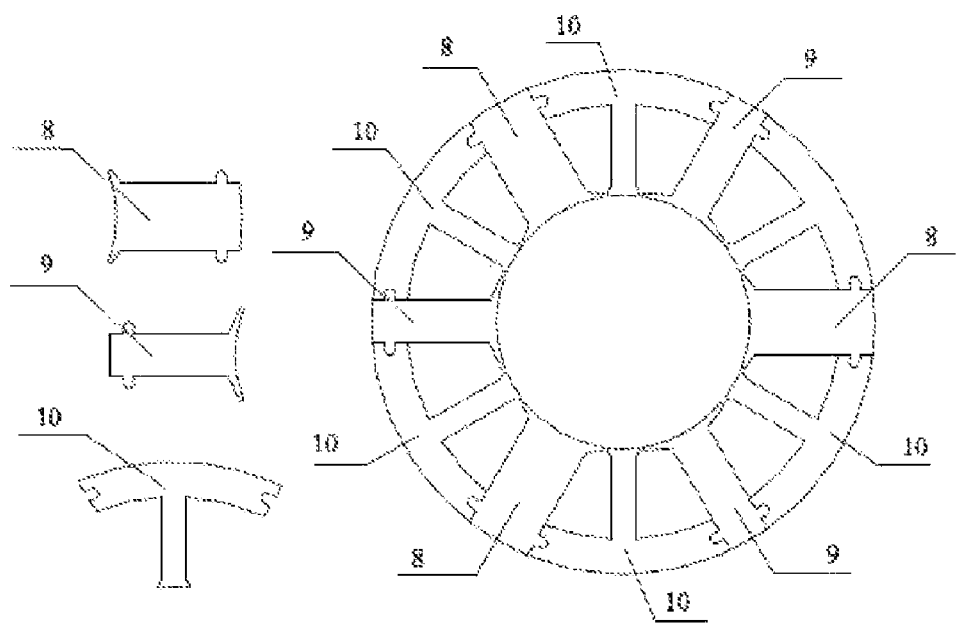
FIG. 6 is another embodiment of the stator punched segment consisting of three kinds of fan-shaped punched segments.

In practical implementation, the stator core as shown in FIG. 5 comprising the big-pole fan-shaped punched segment 8, the medium-pole fan-shaped punched segment 9 and the small-pole fan-shaped punched segment 10 can be adopted; in FIG. 4, there are arc extension arms outside of the small-pole fan-shaped punched segments, while in FIG. 5, there are arc extension arms outside of the big-pole and medium-pole fan-shaped punched segments. The stator core as shown in FIG. 6 can also be adopted, in which the bosses are placed on the big-pole and medium-pole fan-shaped punched segments and the grooves placed on the small-pole fan-shaped punched segments. To decrease the influence of joints on magnetic circuit of the stator core, the stator punched segments with grooves and bosses placed on different positions can be adopted and alternately laminated into a whole stator.

Figure 7:
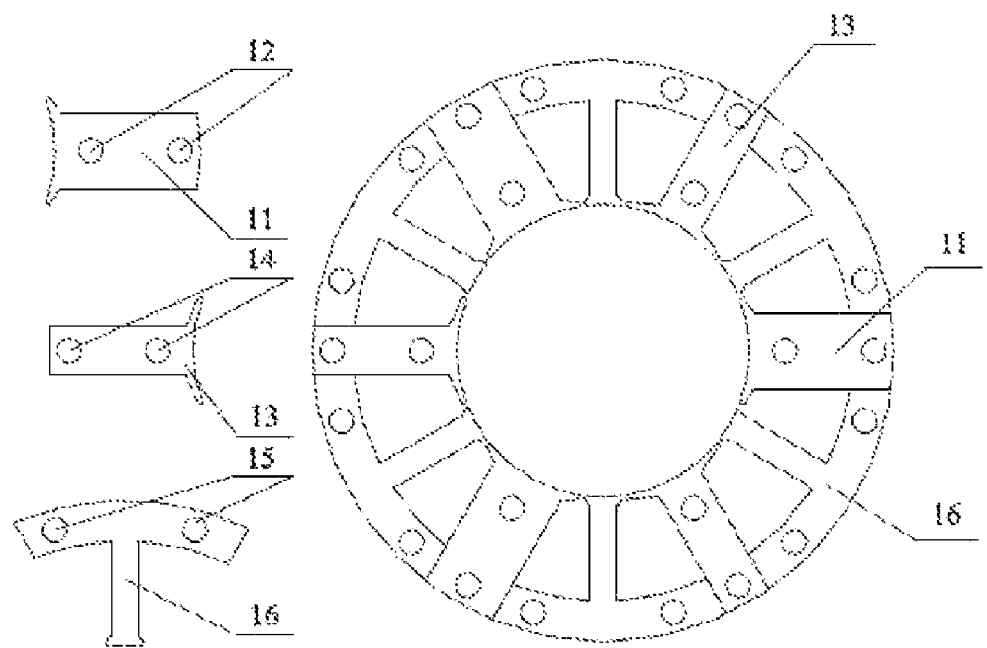
FIG. 7 is a schematic diagram of multi-layer silicon steel sheets forming three kinds of the tooth pole, and then forming the whole stator core.

In the embodiment as shown in FIG. 7, multi-layer silicon steel sheets are laminated into three shapes of fan-shaped tooth poles, which then form the stator core; the big tooth pole is made of big-pole fan-shaped punched segment 11 by laminated, in which there are position blind holes 12 placed on the yoke end and the tooth end of the punched segments, through which the fan-shaped punched segments are riveted and laminated into the whole tooth pole; the medium tooth pole is made of medium-pole fan-shaped punched segment 13 by laminated, in which there are position blind holes 14 placed on the yoke end and the tooth end of the punched segments, through which the fan-shaped punched segments are riveted and laminated into the whole tooth pole; the small tooth pole is made of small-pole fan-shaped punched segment 16 by laminated, in which there are position blind holes 15 placed on both ends of the yoke of the punched segments, through which the fan-shaped punched segments are riveted and laminated to the whole tooth pole. A whole stator core is formed by the tooth poles in the order of "the A-phase big teeth pole→the small tooth pole→the /C-phase medium tooth pole→the small tooth pole→the B-phase big tooth pole→the small tooth pole→the A-phase medium tooth pole→the small tooth pole→the C-phase big tooth pole→the small tooth pole→the /B-phase medium tooth pole→the small tooth pole".

Figure 8:
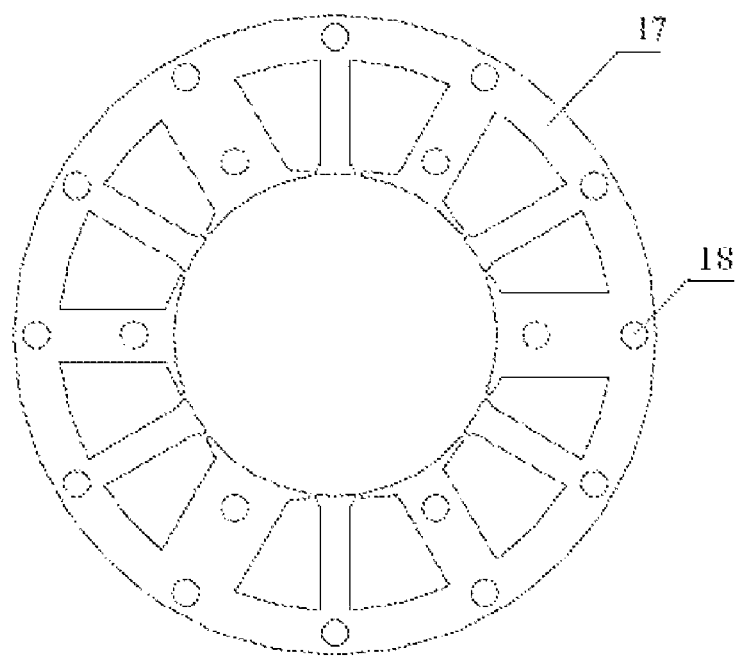
FIG. 8 is a schematic diagram of whole silicon steel sheets with three tooth shapes forming a whole stator core.

In the embodiment as shown in FIG. 8, each layer of silicon steel sheet is a whole stator punched segment, that is, whole silicon steel sheet 17, which includes three tooth shapes distributed in circle in the order of "the A-phase big tooth→the small tooth→the /C-phase medium tooth→the small tooth→the B-phase big tooth→the small tooth→the A-phase medium tooth→the small tooth→the C-phase big tooth→the small tooth pole→the /B-phase medium tooth→the small tooth"; a whole stator core can be made of multi-layer whole silicon steel sheets by self-riveting or riveted with rivets and laminated. The blind holes 18 used for riveting are placed on each layer of whole silicon steel sheet. The corresponding three-phase concentrated windings are directly wound on the insulation of the big tooth pole and the medium tooth pole by stator winding machine according to this order: A-phase big tooth pole→/A-phase medium tooth pole; B-phase big tooth pole→/B-phase medium tooth pole; C-phase big tooth pole→/C-phase medium tooth pole. After wound in this way, two concentrated windings of each phase are connected in series, thereby the connection can be reduced and the process of production is simplified.

The three-phase square-wave permanent-magnet brushless DC motor presented in this invention has a series of advantages: windings end minimization, air-gap minimization, material minimization, cogging torque minimization and loss minimization, accordingly has a higher ratio of power to volume, a higher ratio of torque to volume and minimized cost. In the inventive square-wave brushless motor, its controller can employ continuous current sampling and closed-loop control, and its comprehensive performance surpasses that of the sine-wave AC servo system. The said three-phase square-wave permanent-magnet brushless DC motor will replace the existing sine-wave AC servo motor and its servo units as the main branch of the future servo motor and its servo units.

What is claimed is:

1. A three-phase square-wave permanent magnet brushless DC motor with a plurality of pairs of permanent magnets placed on a rotor core and three-phase windings placed in slots of a stator core comprising:

the number 2P of magnetic poles on said rotor core is 8;

the slot number Z of said stator core is 12, accordingly there are 12 teeth, the opening width of said slot (3) is 0.1~3.0 mm, said 12 teeth include three big teeth, three medium teeth and six small teeth;

said three-phase windings are concentrated windings, which are respectively wound on the big teeth and the medium teeth, said three-phase windings and said teeth are arranged in this order: A-phase windings on the big tooth→the small tooth→/C-phase windings on the medium tooth→the small tooth→B-phase windings on the big tooth→the small tooth→/A-phase windings on the medium tooth→the small tooth→C-phase on the big tooth→the small tooth→/B-phase windings on the medium tooth→the small tooth; herein, A indicates a concentrated winding of the A-phase windings, /A is a reversal concentrated winding of A-phase windings, and B, /B, C, /C can be deduced by analogy.

2. The three-phase square-wave permanent magnet brushless DC motor according to claim 1, wherein each big tooth on said stator core accounts for 50° (±5°) of mechanical angle in a circle, that is, 200° (±20°) of electrical angle; each medium tooth accounts for 40° (±5°) of mechanical angle in a circle, that is, 160° (±20°) of electrical angle; each small tooth accounts for 15° (±5°) of mechanical angle in a circle; in which, the opening width of the slot is included in the mechanical angle that each tooth accounts for; and the sum of the mechanical angles of one big tooth, one medium tooth and two small teeth must be 120°.

3. The three-phase square-wave permanent magnet brushless DC motor according to claim 2, wherein the magnetic pole N and S of each permanent magnet on said rotor core are arranged alternately, said permanent magnet is a tegular magnetic steel with radial magnetization or parallel magnetization.

4. The three-phase square-wave permanent magnet brushless DC motor according to claim 3, wherein a physical air-gap between said stator and rotor is 0.2~2 mm.

5. The three-phase square-wave permanent magnet brushless DC motor according to claim 4, wherein a physical size of polar distance $\pi D/8$ of the permanent magnet on said rotor core is 10~56 mm, in which D represents an external diameter of the rotor.

6. The three-phase square-wave permanent magnet brushless DC motor according to claim 1, wherein said stator core can be made of multi-layer splicing silicon steel sheets through self-riveting and laminated; each layer of the splicing silicon steel sheets is spliced by big, medium and small fan-shaped punched segments, which are distributed in the order of the big-pole fan-shaped punched segment→the small-pole fan-shaped punched segment→the medium-pole fan-shaped punched segment→the small-pole fan-shaped punched segment→the big-pole fan-shaped punched segment→the small-pole fan-shaped punched segment→the medium-pole fan-shaped punched segment→the small-pole fan-shaped punched segment→the big-pole fan-shaped punched segment→the small-pole fan-shaped punched segment→the medium-pole fan-shaped punched segment→the small-pole fan-shaped punched segment on a plane to form a stator punched segment, that is, a layer of splicing silicon steel sheet, two adjacent fan-shaped punched segments are joined by grooves or bosses placed on the outside of yokes.

7. The three-phase square-wave permanent magnet brushless DC motor according to claim 6, wherein the grooves are placed on the outsides of the yokes of the big-pole and medium-pole fan-shaped punched segments and bosses on the outside of the yoke of the small-pole fan-shaped punched segment; or the bosses are placed on the outsides of the yokes of the big-pole and medium-pole fan-shaped punched segments and the grooves on the outside of the yoke of small-pole fan-shaped punched segment.

8. The three-phase square-wave permanent magnet brushless DC motor according to claim 1, wherein multilayer silicon steel sheets are laminated into three shapes of a fan-shaped tooth pole which then form said stator core; in which the big tooth pole is made of the big-pole fan-shaped punched segments by laminated, the medium tooth pole is made of the medium-pole fan-shaped punched segments by laminated, and the small tooth pole is made of the small-pole fan-shaped punched segments by laminated; in each tooth pole, there are position blind holes separately placed at each fan-shaped punched segment, through which many fan-shaped punched segments are riveted and laminated into a whole tooth pole; a whole stator core is formed by said three kinds of the tooth pole arranged in the order of "the A-phase big teeth pole→the small tooth pole→the /C-phase medium tooth pole→the small tooth pole→the B-phase big tooth pole→the small tooth pole→the /A-phase medium tooth pole→the small tooth pole→the C-phase big tooth pole→the small tooth pole→the /B-phase medium tooth pole→the small tooth pole".

9. The three-phase square-wave permanent magnet brushless DC motor according to claim 1, wherein said stator core is made of multi-layer whole silicon steel sheets through self-riveting or riveted by rivets and laminated; there are all the three shapes of teeth in each layer of the whole silicon steel sheet, the teeth with three kinds of shapes will be distributed circularly in a circle in the order of the A-phase big tooth→the small tooth→the /C-phase medium tooth→the small tooth→the B-phase big tooth→the small tooth→the /A-phase medium tooth→the small tooth→the C-phase big tooth→the small tooth→the /B-phase medium tooth→the small tooth.

* * * * *